United States Patent Office 3,496,149
Patented Feb. 17, 1970

3,496,149
PROCESS FOR PRODUCING POLYAMIDES OF HIGH DEGREE OF POLYMERIZATION
Shigemitsu Tsunawaki and Michio Goto, Mihara-shi, Japan, assignors to Teijin Limited, Osaka, Japan, a corporation of Japan
No Drawing. Continuation of application Ser. No. 496,129, Oct. 14, 1965. This application Oct. 29, 1968, Ser. No. 771,674
Claims priority, application Japan, Oct. 20, 1964, 39/59,630
Int. Cl. C08g 20/12
U.S. Cl. 260—78          8 Claims

ABSTRACT OF THE DISCLOSURE

A process for increasing the viscosity of a polyamide polymer to produce a fiber-forming polymer having an intrinsic viscosity of at least 1.5 deciliters per gram as measured in meta-resol at 35° C. which process consists essentially of passing an atmosphere of dry, inert gas, at a rate in the range between 0.5 and 1.5 cubic meters of gas measured at 0° C. and 760 mm. Hg per minute per square meter of surface of the following defined reaction mixture, over and in contact with the surface of a reaction mixture of a polyamide polymer which polymer has an intrinsic viscosity of at least 0.6 deciliter per gram as measured in meta-cresol at 35° C. and has end groups available for further polymerization to an intrinsic viscosity of at least 1.5 deciliters per gram as measured in meta-cresol at 35° C. The reaction mixture is maintained at a temperature of about 240 to 285° C. to cause polymerization and the reaction mixture is subjected to stirring conducted at a rate requiring a power input of at least 2.0 kilowatts per cubic meter of the reaction mixture as measured at the final viscosity of the reaction mixture until the intrinsic viscosity thereof has risen to at least 1.5.

---

This application is a continuation of application Ser. No. 496,129 filed Oct. 14, 1965 now abandoned.

This invention relates to a process for producing linear polyamides of high degree of polymerization, which are suitable for shaping by melt-extrusion. The object of the present invention is to provide a process for readily producing those linear polyamides of high degree of polymerization, which were exceedingly difficult to produce by the customary processes.

Heretofore, the synthetic linear polyamides have been produced from monoaminocarboxylic acids or their lactams, or from diamines and dicarboxylic acids.

Generally, in polymerizing polyamides, it is well known to carry out the polymerization reaction with stirring in a stream of an inert gas, using for polymerization of lactams a catalyst, such as water or an acid.

And it is also known that completing of this polymerization reaction is promoted by the elimination of water from the reaction mixture.

In the industrial field, a demand has arisen for polyamides of higher than the usual degree of polymerization. For obtaining these polyamides of high degree of polymerization, processes have been proposed in the past, such as that of heating and melting under reduced pressure in the presence of a catalyst such as a mineral acid, particularly phosphoric acid, or that of effecting the polymerizaton in the solid phase at a temperature below the melting point, or that of effecting the melt polymerization over an extended period of time in a stream of a large quantity of nitrogen gas.

These processes however have the following respective drawbacks. Namely, in the case where heating and melting is carried out under reduced pressure in the presence of a mineral acid (particularly phosphoric acid) not only is it difficult to obtain a product of high degree of polymerization, but also undesirable depolymerization occurs during the melting and shaping step due to the minute amount of the mineral acid that is present, with the consequence that the degree of polymerization decreases.

On the other hand, in the case of solid phase polymerization, owing to the fact that the polymerization reaction proceeds while retaining the crystalline state, the apparent melt viscosity becomes exceeding high, with the conesquence that shaping by melt-extrusion becomes very difficult.

In the case of the process wherein the melt polymerization is carried out over and extended period of time in a stream of a great amount $N_2$ gas, there is the drawback that the polymer may be discolored, or the formation of a horny substance, so-called "gel," takes place by the polymer being subjected to the effects of the small quantities of oxygen that are usually present in the $N_2$ gas or subjected to the local overheating that occurs due to the nonuniform exposure of the polymer to the various cooling influences in the reaction zone.

Of still greater importance besides the above-mentioned drawbacks is that it is very difficult to obtain according to these prior art processes a polyamide of a degree of polymerization high enough to be suitable for industrial uses, for example, one whose intrinsic viscosity is above 1.5 as measured in units of deciliters per gram in meta-cresol solution at 35° C.; hereinafter referred to as intrinsic viscosity. The intrinsic viscosities herein cited are those for washed and dried polymer, i.e. polymer as obtained directly from the reaction which has been leached to remove monomer and low molecular weight hot water soluble constituents such as cyclic dimers and trimers; then dried to not above 0.1% moisture.

Thus, even when polymerization is carried out over an extended period of time under a nitrogen stream in accordance with the foregoing prior art process with the intent of obtaining a polyamide product whose degree of polymerization is high, it is generally impossible to obtain one having an intrinsic viscosity above 1.5. And for obtaining one having an intrinsic viscosity on the order of 1.5, the reaction time required is a long one of over 30 hours. As a result of subjecting the polymer to severe conditions over such a long period of time, undesirable local gelling, cross-linking and discoloration occur to an extent which interferes with melt-shaping, and in particular with spinning, with the consequence that satisfactory products cannot be obtained.

Such being the case, we carried out researches for obtaining with a relatively short reaction time a polyamide having an intrinsic viscosity of above 1.5, with the consequence that the present invention was arrived at.

Thus, the invention is a process for producing polyamides, especially poly-e-caproamide, of a high degree of polymerization of above 1.5, which consists essentially of carrying out the polymerization reaction while passing a dry, inert gas over and in contact with the surface of the reaction mixture at the rate of 0.5 to 1.5 $Nm.^3$ per minute per unit area ($m.^2$) and while stirring the reaction mixture at a rate requiring a power input of at least 2.0 kw. per unit volume ($m.^3$) as measured at the final viscosity reached in the reaction mixture. ("m." herein is used as an abbreviation of "meter"; "N" signifies gas volumes measured under "normal conditions" viz 0° C. and 760 mm. of mercury pressure; and "kw." is an abbreviation of "kilowatt.").

As previously noted, when the polymerization residence time of the polyamide extends over a long period of time, particularly over 30 hours, the melt-shaping, and particularly the spinning, of the resulting high polymer becomes exceedingly difficult to carry out on account of the formation of so-called gels having cross-linkages and those structures resulting from the entanglement of the high molecules between themselves. However, in accordance with the present invention, polyamides of high degree of polymerization, i.e., those having an intrinsic viscosity above 1.5, can be obtained readily in a relatively short period of time as a result of the passage of an inert gas in at least a prescribed amount and stirring with the prescribed power input. The spinning of the resulting polymer is very readily accomplished.

Next will be shown the viscosity attained, the spinnability and the good-product ratio obtained in the fibers when polymerization of ε-caprolactam was carried out using a constant polymerization temperature and nitrogen gas flow rate but varying the stirring effect by employing various levels of power input per cubic meter for stirring the reaction mixture.

It is to be noted that, in this experiment, as the values of pack initial pressure became less and the pack exchange coefficient and the good product ratio became greater the indication is that the results attained are more satisfactory.

gas of 0.5 to 1.5 Nm.$^3$ per square meter of reaction mixture surface.

Use may be made of the generally used pigments, the organic and inorganic stabilizers, etc., in practicing the invention. Further, the invention process can be practiced either batchwise or continuously in the stirring type polymerization.

The following summarizes the advantages obtainable by the invention. When the polymerization reaction was carried out in accordance with a prior art method involving flowing a great amount of an inert gas over the reaction mixture of over 30 hours, polyamide having an intrinsic viscosity of above 1.50 was not obtainable. According to the present invention however, by combining the above specified stirring effect and the above specified rate of flow of an inert gas, it has been made possible to produce polyamides which can be shaped by melt-extrusion from an orifice, which polyamides have a high degree of polymerization corresponding to intrinsic viscosity of at least 1.50 and which have good fiber-forming properties. And since a catalyst can be used which is ultimately removed, the viscosity stability of the resulting polymer is good. Preferably, water is the sole catalyst of polymerization used.

THE INFLUENCE OF THE STIRRING EFFECT IN THE POLYMERIZATION OF ε-CAPROLACTAM

| Reaction method | Input stirring power (kw./m$^3$) | Residence time (hr.) | Attained intrinsic viscosity | Pack initial pressure,[1] kg./cm.$^2$ (gauge) | Pack exchange coefficient [2] | Good product ratio [3] (percent) |
|---|---|---|---|---|---|---|
| Batch | 1.5 | 36.4 | 1.47 | 240 | 0.75 | 28 |
| Do | 1.8 | 32.5 | 1.48 | 225 | 0.875 | 34 |
| Do | 2.0 | 24.0 | 1.50 | 225 | 0.833 | 65 |
| Continuous | 3.3 | 28.0 | 1.60 | 215 | 1.00 | 68 |
| Batch—continuous | 3.3 | 22.0 | 1.54 | 195 | 1.63 | 94 |
| Do | 4.0 | 18.0 | 1.58 | 198 | 1.75 | 92 |

[1] Pressure on the polymer melt entering the spinning pack, initially required to produce the desired flow rate of polymer through the pack and spinneret.
[2] Number of days operation obtained with a filter, before changing it.
[3] Percent of packages produced which were complete packages.

As is apparent from these results, when the input stirring power is less than 2.0 kw./m.$^3$, the intrinsic viscosity does not reach 1.5, even though an extended period of time is employed. Moreover, since the polymerization time extends to over 30 hours, the spinnability is poor and the quality of the resulting product is also inferior. In contrast, when the input stirring power is at least 2.0 kw./m.$^3$, according to the present invention, not only is it possible to obtain a product of high degree of polymerization having an intrinsic viscosity of at least 1.5 with a short polymerization time but the spinnability and the quality of the resulting product are also fully satisfactory. The results improve sharply to well above ordinarily obtainable spinnability at an input stirring power level of about 3 to 4. Still higher levels can be used but offer no particular advantage to compensate for the resulting increase in power cost.

Further, according to the present invention, besides the necessity for input stirring power of at least 2.0 kw./m.$^3$, it is also necessary to pass a dry, inert gas at the rate of 0.5 to 1.5 Nm.$^3$ per minute per unit area (m.$^3$) over the surface of the reaction mixture.

As the inert gas, preferably nitrogen is used, and particularly preferred is an inert gas dried to a dew point not above about −30° C.

When the rate of flow of the inert gas is less than 0.5 Nm.$^3$ per square meter of reaction mixture surface, a polymer having a high degree of polymerization whose intrinsic viscosity is at least 1.50 cannot be obtained. On the other hand, when the inert gas flow is above 1.5 Nm.$^3$ per square meter of surface, a polymer which is discolored is obtained as a result of the influence of the impurities of the inert gas or local overheating of the reaction mixture. Accordingly, according to the invention, the reaction is carried out at a rate of flow of the inert The invention process will be fully described by means of the following example.

Example

The vessel used was equipped with a jacket for carrying a heat exchange medium and with an anchor type stirrer which projected above the surface of the reaction mixture in the charged vessel. The vessel had entry and exit ports for passing an inert gas or steam over the reaction mixture. The vessel was charged with purified ε-caprolactam (having "permanganate number", as defined in U.S. Patent 3,021,326 issued Feb. 13, 1962 to Snider et al. for "Purification of Caprolactam," not over 10) and additives. The additives were organic and inorganic stabilizers which do not affect the melt stability. As the inert gas, nitrogen was used having a dew point of −30° C. and containing less than 20 p.p.m. of oxygen. The temperature inside the polymerization vessel was raised to 200° C. at the rate of 20° C./hr. and to 230° C. at the rate of 10° C./hr., the stirring being started at 240° C.

The reaction was conducted in two stages, stage I being the lactam ring-opening recation stage, which after a purge of the vessel was followed by the polycondensation reaction carried out by flowing the N$_2$ gas. The reaction mixture from stage I, after being purged with steam, had an intrinsic viscosity of 0.6.

To initiate the stage II reaction, the N$_2$ gas is flowed at the rate of 0.88 Nm.$^3$/min./m.$^2$. With the stirrer rotating at 28 r.p.m., the intrinsic viscosity leveled off at 1.58 in 12 hours and the polymer product exhibited good fiber-forming properties. The volume of the reaction mixture was 3.0 m.$^3$, and the power required for stirring at 28 r.p.m., at the equilibrium viscosity of 1.58, was 12 kw. Hence, the input power was 4.0 kw./m.$^3$.

When the stage II reaction was carried out in the same manner with an r.p.m. of 14, at the equilibrium viscosity the power input was 5.5 kw. In this case, the intrinsic viscosity attained was only 1.48 and the input stirring power was 1.8 kw./m.³.

Further, when hexamethylene adipamide (6.6-nylon salt) was used and was polymerized in exactly the same manner at 275–285° C. in a 0.5 m.³-polymerization vessel, it was possible to obtain readily 6.6-nylon of high degree of polymerization in exactly the same manner by means of the combination of the same input stirring power range and the same inert sweep gas flow rates as above specified.

It is claimed:

1. A process for increasing the viscosity of epsilon-caprolactam polymer to produce a fiber-forming polymer having an intrinsic viscosity of at least 1.5 deciliters per gram as measured in meta-cresol at 35° C. which process consists essentially of passing an atmosphere of dry, inert gas, at a rate in the range between 0.5 and 1.5 cubic meters of gas measured at 0° C. and 760 mm. Hg per minute per square meter of surface of the below defined reaction mixture, over and in contact with the surface of a reaction mixture of epsilon-caprolactam polymer which polymer has an intrinsic viscosity of at least 0.6 deciliter per gram as measured in meta-cresol at 35° C. and has end groups available for further polymerization to an intrinsic viscosity of at least 1.5 deciliters per gram as measured in meta-cresol at 35° C.; said reaction mixture being maintained at a temperature of about 240 to 285° C. to cause polymerization and said reaction mixture being subjected to stirring conducted at a rate requiring a power input of at least 2.0 kilowatts per cubic meter of the reaction mixture as measured at the final viscosity of said reaction mixture until the intrinsic viscosity thereof has risen to at least 1.5.

2. The process of claim 1 wherein the power input is between about 3 and 4 kilowatts per cubic meter of the reaction mixture as measured at the final viscosity of the reaction mixture.

3. The process of claim 2 wherein the dry, inert gas is nitrogen having a dew point not above about −30° C.

4. The process of claim 1 wherein the polymerization is carried out at a temperature of about 240° C.

5. A process for increasing the viscosity of hexamethylene adipamide polymer to produce a fiber forming polymer having an intrinsic viscosity of at least 1.5 deciliters per gram as measured in meta-cresol at 35° C. which process consists essentially of passing an atmosphere of dry, inert gas, at a rate in the range between 0.5 and 1.5 cubic meters of gas measured at 0° C. and 760 mm. Hg per minute per square meter of surface of the below defined reaction mixture, over and in contact with the surface of a reaction mixture of hexamethylene adipamide polymer which polymer has an intrinsic viscosity of at least 0.6 deciliter per gram as measured in meta-cresol at 35° C. and has end groups available for further polymerization to an intrinsic viscosity of at least 1.5 deciliters per gram as measured in meta-cresol at 35° C.; said reaction mixture being maintained at a temperature of about 240 to 285° C. to cause polymerization and said reaction mixture being subjected to stirring conducted at a rate requiring a power input of at least 2.0 kilowatts per cubic meter of the reaction mixture as measured at the final viscosity of said reaction mixture until the intrinsic viscosity thereof has risen to at least 1.5.

6. The process of claim 5 wherein the power input is between about 3 and 4 kilowatts per cubic meter of the reaction mixture as measured at the final viscosity of the reaction mixture.

7. The process of claim 6 wherein the dry, inert gas is nitrogen having a dew point not above about −30° C.

8. The process of claim 5 wherein the polymerization is carried out at a temperature of about 275 to 285° C.

References Cited

UNITED STATES PATENTS

| | | | |
|---|---|---|---|
| 3,040,005 | 6/1962 | Barnhardt et al. | 260—78 |
| 3,043,805 | 7/1962 | Burg | 260—78 |
| 3,090,773 | 5/1963 | Papero et al. | 260—78 |
| 3,106,548 | 10/1963 | Lavalou | 260—78 |
| 3,109,835 | 11/1963 | Apostle et al. | 260—78 |
| 3,171,829 | 3/1965 | Wiesner et al. | 260—78 |
| 3,155,637 | 11/1964 | Reichold et al. | 260—78 |
| 3,254,138 | 5/1966 | Hagemeyer et al. | 260—89.7 |
| 3,294,756 | 12/1966 | Russell et al. | 260—78 |
| 3,295,182 | 1/1967 | Robbins et al. | 260—72 |

HAROLD D. ANDERSON, Primary Examiner

U.S. Cl. X.R.

260—78, 95